(12) United States Patent
Hottebart et al.

(10) Patent No.: US 9,366,174 B2
(45) Date of Patent: Jun. 14, 2016

(54) SAFETY DEVICE FOR OPERATING A CATALYTIC CONVERTER SCREEN

(71) Applicant: RENAULT s.a.s., Boulonge-Billancourt (FR)

(72) Inventors: Pascal Hottebart, Eragny (FR); Jean-Luc Gateau, Saint Germain de la Grange (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/365,843

(22) PCT Filed: Dec. 10, 2012

(86) PCT No.: PCT/EP2012/074898
§ 371 (c)(1),
(2) Date: Sep. 2, 2014

(87) PCT Pub. No.: WO2013/087551
PCT Pub. Date: Jun. 20, 2013

(65) Prior Publication Data
US 2015/0052881 A1 Feb. 26, 2015

(30) Foreign Application Priority Data
Dec. 16, 2011 (FR) ...................................... 11 61801

(51) Int. Cl.
| | |
|---|---|
| *F01N 3/10* | (2006.01) |
| *F01N 1/00* | (2006.01) |
| *F01N 13/14* | (2010.01) |
| *B60R 13/08* | (2006.01) |
| *F01N 13/00* | (2010.01) |

(Continued)

(52) U.S. Cl.
CPC ............ *F01N 13/14* (2013.01); *B60R 13/0876* (2013.01); *F01N 13/008* (2013.01); *F01N 13/1805* (2013.01); *F01N 2260/20* (2013.01); *F02B 77/086* (2013.01)

(58) Field of Classification Search
CPC ... F01N 13/008; F01N 13/14; F01N 13/1805; F01N 2260/20; F02B 77/086; F02B 77/11; B60R 13/0876
USPC ..................................................... 60/272, 299
See application file for complete search history.

(56) References Cited

U.S. PATENT DOCUMENTS 4,748,807 A * 6/1988 Vladimir ......................... 60/299
5,791,782 A * 8/1998 Wooten et al. ................. 374/208
(Continued)

FOREIGN PATENT DOCUMENTS

| | | |
|---|---|---|
| EP | 1 788 215 | 5/2007 |
| EP | 2 070 771 | 6/2009 |
| JP | 8 296436 | 11/1996 |

OTHER PUBLICATIONS

French Search Report Issued Sep. 5, 2012 in Application No. 1161801 Filed Dec. 16, 2011.
(Continued)

*Primary Examiner* — Jesse Bogue
*Assistant Examiner* — Diem Tran
(74) *Attorney, Agent, or Firm* — Oblon, McClelland, Maier & Neustadt, L.L.P.

(57) ABSTRACT

A safety device for operating a catalytic converter, including: a heat screen installed substantially on a portion of an outer wall of the catalytic converter, and including an opening through which a measuring device attached onto the catalytic converter is to pass, the measuring device including a substantially cylindrical base configured to engage with the catalytic converter; a safety device to be arranged on the heat screen, the safety device including a plate including a circular opening having a diameter that is greater than a diameter of a base, the opening being delimited by a lip; and a device for attaching the plate to the heat screen such that the lip surrounds the base with a minimum clearance.

21 Claims, 3 Drawing Sheets

(51) Int. Cl.
  *F01N 13/18*   (2010.01)
  *F02B 77/08*   (2006.01)

(56) References Cited

U.S. PATENT DOCUMENTS

| 7,774,936 | B2* | 8/2010 | Kroner et al. | 29/890 |
| 2002/0023486 | A1* | 2/2002 | Watanabe et al. | 73/202.5 |
| 2004/0163468 | A1* | 8/2004 | Nelson et al. | 73/431 |
| 2006/0219433 | A1 | 10/2006 | Beutter et al. | |
| 2007/0280780 | A1 | 12/2007 | Bruehl et al. | |
| 2011/0067952 | A1 | 3/2011 | Oxenknecht et al. | |

OTHER PUBLICATIONS

International Search Report Issued Jan. 15, 2013 in PCT/EP12/074898 Filed Dec. 10, 2012.

* cited by examiner

SAFETY DEVICE FOR OPERATING A CATALYTIC CONVERTER SCREEN

FIELD OF THE INVENTION

The present invention relates to an internal combustion engine for a motor vehicle and the external protection of a catalytic converter mounted at the side of the engine.

The invention relates more particularly to a device for protecting an opening arranged on a catalytic converter protection screen, said opening permitting the positioning of a means for measuring operating parameters of a catalytic converter.

PRIOR ART

Internal combustion engines are subject to increasingly strict environmental protection regulations. As a result, internal combustion engines are provided with fittings and components to improve the removal of pollutants at the outlet of the engine. The catalytic converter is one of these components and is arranged downstream of the engine in the direction of flow of the gases. The operation of the catalytic converter makes it possible to reduce the emissions of three pollutants: carbon monoxide (toxic CO), nitrogen oxides (ozone precursors) and also non-combusted hydrocarbons (which are polluting and often mutagenic and carcinogenic). As a result, the operation of the catalytic converter is monitored by putting in place measuring means, such as temperature sensors.

The catalytic converter is also a source of high temperatures as it is arranged immediately adjacent to the outlet of an exhaust manifold of the gases from the engine. At least one heat screen is thus arranged on at least one external face of the catalytic converter for protecting the environment in contact with said catalytic converter.

The heat screen comprises through-openings for fixing the measuring means, in particular means for measuring the temperature, said openings being dimensioned to be sufficiently wide in order to take into account the variety of tolerances of the parts which are fixed to the catalytic converter.

The catalytic converter is generally arranged in the vicinity of engine components such as oil return pipes which may comprise several parts, with connecting flanges between said parts. Leakages of inflammable liquids, for example oil, may thus occur in the region of said connecting flanges and fall onto the heat screen, and then onto the catalytic converter via the opening arranged for fixing the measuring means which is a potential fire risk.

Means for protecting openings which are fixed to the heat screen are known. The publication JP 200607403 discloses a pan comprising an opening for the passage of measuring means. The pan is in the form of a convex plate facing toward the outside of the engine and comprising an opening for the passage of the measuring means, said opening having a diameter which is substantially less than the external diameter of a base of the measuring means, such that the pan is pressed between the heat screen and base of the measuring means. Said pan has an external diameter which is substantially less than the opening arranged in the heat screen. Apertures are formed on the periphery of the pan for fixing the pan to the heat screen.

Systems for retaining cables and/or tubes may be arranged in the vicinity of the catalytic converter under the thermal protection of the heat screen which requires, on the one hand, the storage of said retaining systems before positioning at the side of the catalytic converter and, on the other hand, different operations for fixing said systems to the walls of the engine components.

A drawback with this system is that inflammable liquid may potentially pass through the space arranged between the pan and the heat screen.

A further drawback of this system is that the fixing of the pan to the heat screen requires a specific tool.

A further drawback of this system is the convex shape of the pan which is able to collect the inflammable liquid.

BRIEF SUMMARY OF THE INVENTION

An object of the invention is to remedy these drawbacks and the subject of the invention is a device for protecting openings arranged in a heat screen of a catalytic converter which is simple to produce and easy to position on the heat screen, the device being suitable for retaining tubes and/or cables arranged in the vicinity of the catalytic converter.

The subject of the invention is characterized more particularly by a safety device for operating a catalytic converter, comprising:
- a heat screen installed substantially on a portion of the outer wall of the catalytic converter and comprising an opening designed to have a measuring means fixed to the catalytic converter pass through it, said measuring means comprising a substantially cylindrical base which is designed to engage with the catalytic converter,
- a safety means designed to be arranged on the heat screen, characterized in that the safety means comprises a plate having a circular opening having a diameter which is greater than the diameter of the base, the opening being delimited by a lip; said safety device further having means for fixing the plate to the heat screen such that the lip surrounds the base with a minimum clearance.

According to the particular features of the invention,
- the safety means comprises stiffening ribs,
- the safety means comprises an oblong opening remote from the circular opening,
- the means for fixing the plate comprise a fixing screw arranged on the surface of the heat screen and facing toward the outside of the catalytic converter, the base of the screw being suitable for passing through an oblong opening arranged in the plate remote from the circular opening, and a nut permitting the plate to be locked in position against the heat screen by cooperation with the base of the screw.
- the safety means is obtained from a steel plate.
- the safety means covers a protruding area of the heat screen.
- the safety means comprises at least one means for retaining the cabling or tubes.
- the safety means is extended laterally by at least one branch comprising at least two jaws capable of retaining a cable or cylindrical tube in position.
- the jaws have a flexural elasticity.
- the jaws are pivotably movable.

DETAILED DESCRIPTION OF THE FIGURES

Figure 1:
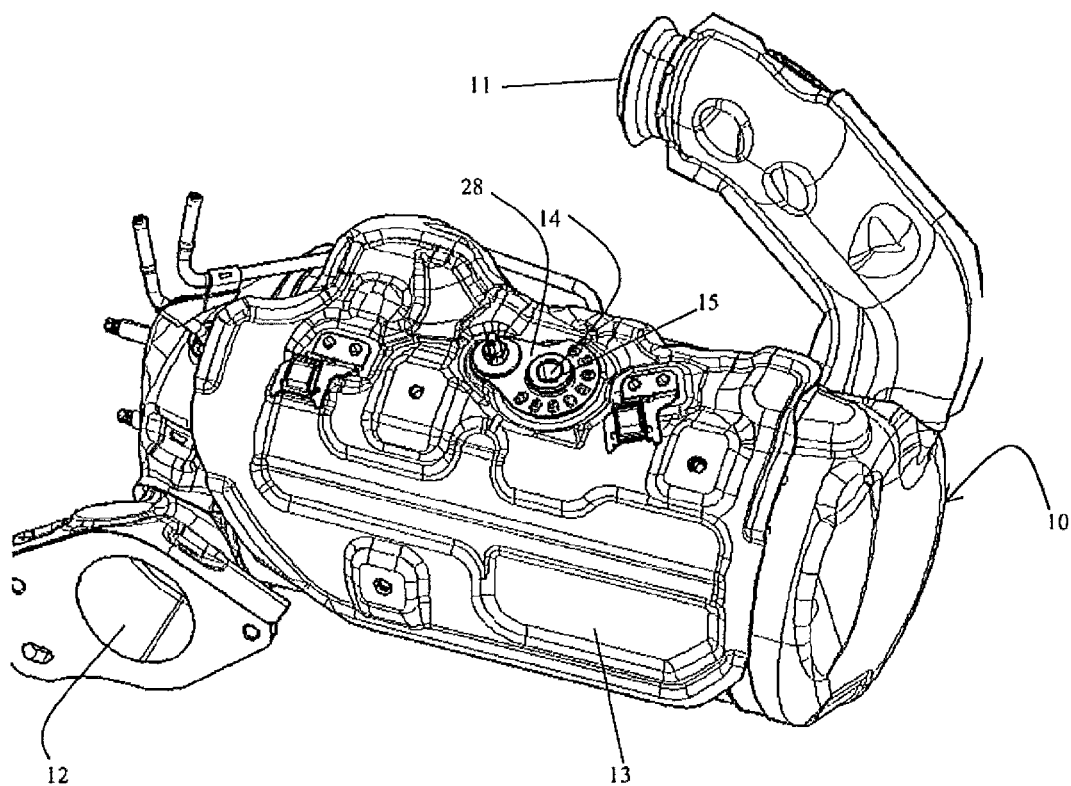
FIG. 1 is a schematic view of the entire catalytic converter.

Elements which are the same and which appear in the different figures retain the same reference numerals.

According to FIG. 1, a catalytic converter 10 is mounted at the side of an internal combustion engine (not shown), downstream in the direction of flow of the gases from an exhaust gas manifold (not shown). The gases pass through the catalytic converter from the inlet 11 to the outlet 12. The gases are very hot as they result directly from the combustion process, and a heat screen 13 is arranged on a portion of the outer wall of the catalytic converter 10 in order to protect the environment.

An opening 14 is arranged in the heat screen 13 opposite a fixing hole 16 of a means (not shown) for measuring the operation of the catalytic converter. In the present example, said measuring means may be a temperature sensor designed to be fixed in the fixing hole to record temperature changes inside the catalytic converter 10. One portion of the measuring means protrudes beyond the heat screen 13 and is connected, for example, to an electronic control system (not shown).

Figure 2:
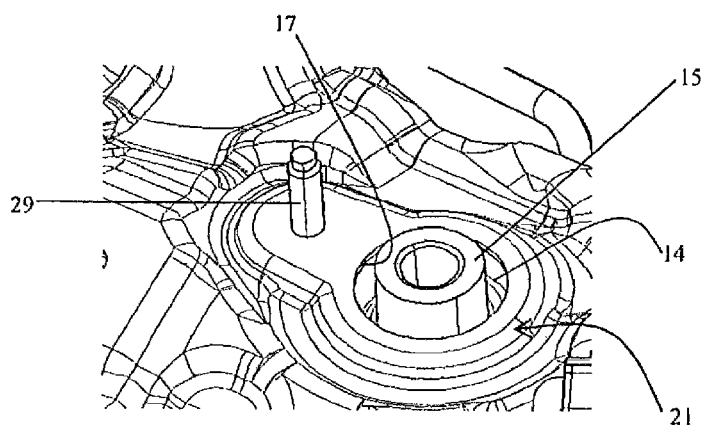
FIG. 2 is a schematic view of a portion of a heat screen.
Figure 3:
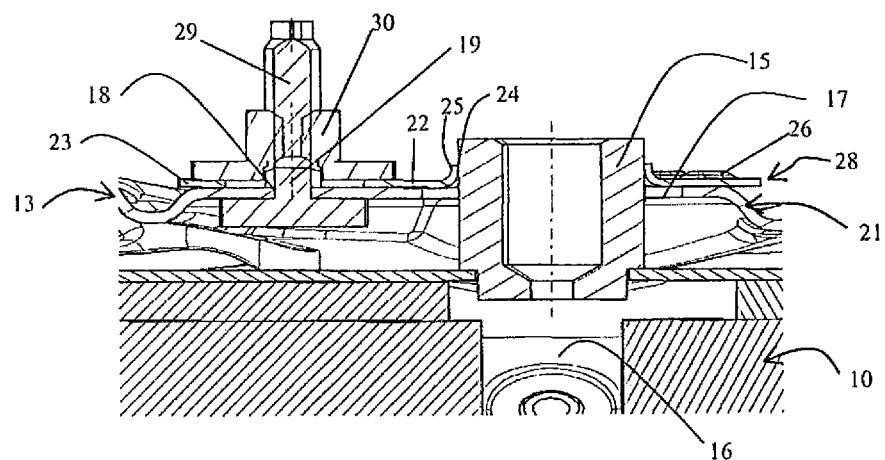
FIG. 3 is a schematic view in cross section of the safety means mounted on the heat screen.

According to FIGS. 2 and 3, a base 15 is fixed to the catalytic converter above the fixing hole. Said base is of substantially tubular shape and protrudes beyond the wall of the heat screen 13. The base is suitable for receiving the measuring means which passes through it and, on the one hand, is housed in the fixing hole 16 and, on the other hand, protrudes substantially beyond the heat screen 13. The base is preferably made of steel.

According to FIG. 3, the heat screen 13 comprises a plate made of sheet steel covering one part of the wall of the catalytic converter 10, which comprises protruding areas and ribs in order to improve the rigidity. A protruding area 21 of the heat screen is preferably arranged above the fixing hole 16 installed in the catalytic converter.

A first opening 17 is produced in this area 21, facing the fixing hole 16, said first opening having a diameter which is substantially greater than the diameter of the base 15 and being designed such that the base 15 passes through it.

The heat screen comprises means for fixing a safety means designed to prevent the passage of inflammable liquid toward the catalytic converter via the opening 17. Said fixing means comprise a second opening 18 formed in said protruding area remote from the first opening 17, a fixing screw 19 and a nut. The fixing screw 19 passes through the opening 18 such that the base of the screw 29 faces away from the catalytic converter 10 and the head of said screw 19 arranged between the heat screen 13 and the catalytic converter 10 may be welded to the heat screen 13.

Figure 4:
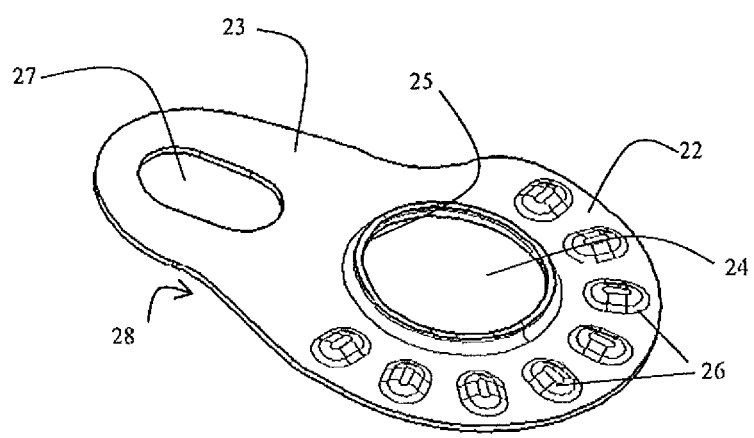
FIG. 4 is a schematic view from above of the safety means according to a first embodiment.

According to a first embodiment shown in FIG. 4, the safety means 28 comprises a first plate 22 having a substantially circular shape and a diameter which is substantially greater than the diameter of the opening 17. Said first plate is extended along an edge portion by a second plate 23 also of substantially circular shape and having a diameter, in this example, which is less than the diameter of the first plate 22. The total surface area of the safety means 28 is substantially greater than the surface area of the protruding area 21.

The first plate 22 comprises a circular opening 24 extended by a circular lip 25 having an axis substantially at right angles to the plane of the plate and the internal diameter thereof being substantially equal to the diameter of the base 15, allowing for clearance, and the lip 25 is suitable for surrounding said base 15. The height of the lip 25 is such that the base protrudes beyond the lip when the safety means is fixed to the heat plate.

"Lip" is understood as a protruding edge or a cylindrical tube, the height thereof being such that the base 15 protrudes beyond the two sides of said tube.

The first plate 22 comprises stiffening ribs 26 which in this embodiment are arranged radially relative to the circular opening 24. Other types of ribs or stiffening means are possible without thereby modifying the invention. The plate which has been made more rigid may be mounted more easily onto the heat screen.

The second plate 23 comprises an oblong opening 27 designed for the passage of the base of the fixing screw 19.

Figure 5:
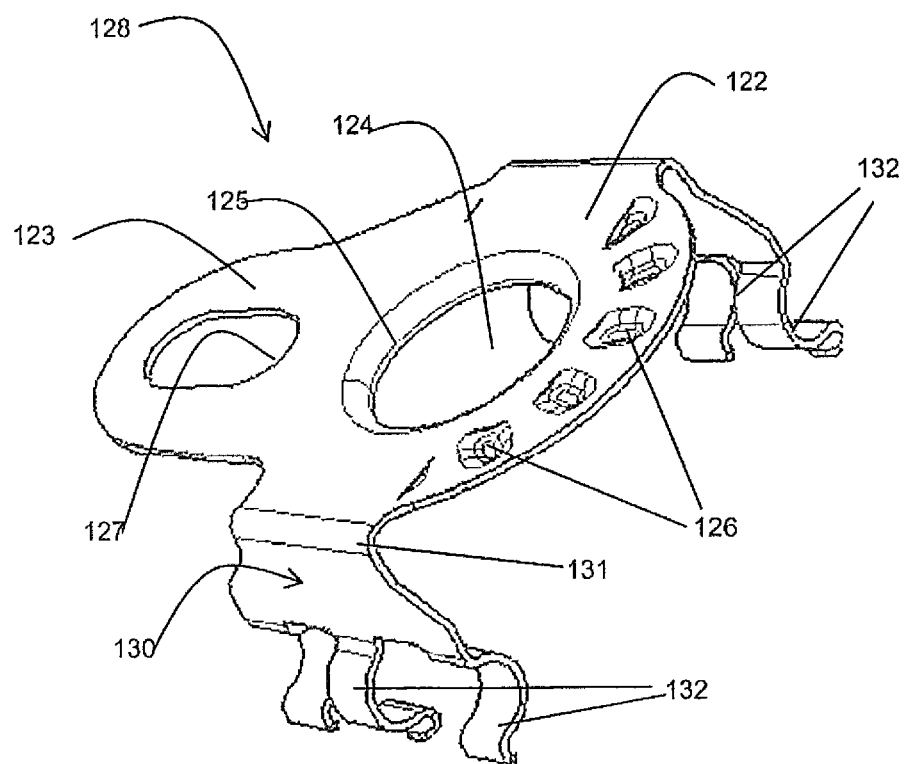
FIG. 5 is a schematic view of the safety means comprising a means for retaining the cable or tube according to a second embodiment.

According to a second embodiment shown in FIG. 5, the safety system 128 comprises a first plate 122 and a second plate 123 similar to the first and second plates of the first embodiment and undertaking the same functions. Thus a circular opening 124 is present, extended by a circular lip 125 and stiffening ribs 126 on the first plate 122, and there is also an oblong hole 127 on the second plate 123. The first plate 122 or the second plate 123 are extended laterally to the outside by a branch 130 which is bent to one side relative to the plane of said plate, and said side is designed to face away from the catalytic converter once the safety means is placed on the wall of the heat screen.

The branch 130 comprises a common part 131 having a length preferably greater than 5 mm from which at least two jaws 132 extend in the same direction in a pivotably movable manner about an axis substantially parallel to the axis connecting the oblong opening 127 to the opening 124 designed to have the base 15 pass through it, or having a flexural elasticity in order to be able to be separated, from an initial closed position, to surround a cable or tube. Once the jaws have been released, they are capable of retaining the cable or tube (not shown) in position.

The safety means 28, 128 is preferably obtained by:
  cutting out from a steel plate, spring steel having favorable mechanical characteristics for this type of part, and said mechanical characteristics preferably being similar to those of the base 15 and the heat screen 13 in order to reduce the clearance and/or the stresses between the different parts,
  stamping the plate.

The embodiment of the safety means 28, 128 is simple and inexpensive.

The installation of the safety means 28, 128 follows:
  the installation of the heat screen 13 around the catalytic converter 10, the heat screen comprising the protruding area 21 comprising the opening 17 designed to have the measuring means and the means for fixing the safety means 28, 128 pass through it,
  the fixing of the base 15 in the catalytic converter 10,
and comprises the steps of:
  pressing the safety means onto the heat screen guided by the lip 25, 125 surrounding the base 15 of the measuring means and by the base of the screw 19 passing through the oblong opening 27, 127,
  screwing the nut 30 onto the fixing screw 19 to retain the safety means against the heat screen.

Once the safety means is in place around the catalytic converter, potential leakages of inflammable liquid falling onto the heat screen are directed onto the surface of the heat screen without the risk of reaching the catalytic converter, passing via the opening for fixing the measuring means.

The object of the invention is achieved as follows: the safety device ensures protection against the risk of fire resulting from the contact of inflammable fluids with a catalytic converter which is a source of high temperatures, the device comprising a safety means for the openings arranged in the heat screen to fix the measuring means, said safety means being easy to implement and permitting the simple retention of the cable or tube arranged in the vicinity of the catalytic converter under the protection of the heat screen.

The invention is not limited to the embodiments presented above and further embodiments may be proposed by the person skilled in the art, in terms of the shape of the first plate 22, 122 or the second plate 23, 123 and/or the dimensions of the second plate which may be substantially different from the above description without thereby modifying the invention. The safety means may comprise a plate covering the surface of the protruding area 21 of the heat screen 13 and further fixing means may ensure the locking of the safety means in position against the heat screen.

The invention claimed is:

1. A safety device for operating a catalytic converter comprising:
    a heat screen installed substantially on a portion of an outer wall of the catalytic converter and including an opening configured to have a measuring means fixed to the catalytic converter pass through the opening, the measuring means comprising a base configured to make contact with the catalytic converter;
    a safety means configured to be arranged on the heat screen, wherein the safety means comprises a plate including a circular opening and an oblong opening spaced apart from the circular opening, the circular opening having a diameter which is greater than a diameter of the base, the circular opening being delimited by a lip; and
    means for fixing the plate to the heat screen such that the lip surrounds the base with a minimum clearance, the means for fixing extending through the oblong opening.

2. The device as claimed in claim 1, wherein the plate comprises stiffening ribs.

3. The device as claimed in claim 1, wherein the means for fixing the plate comprises a fixing screw arranged on a surface of the heat screen and facing toward an outside of the catalytic converter, a base of the screw configured to pass through the oblong opening arranged in the plate remote from the circular opening, a nut permitting the plate to be locked in position against the heat screen by cooperation with the base of the screw.

4. The device as claimed in claim 1, wherein the safety means is obtained from a steel plate.

5. The device as claimed in claim 1, wherein the safety means covers a protruding area of the heat screen.

6. A motor vehicle engine comprising an operating safety device as claimed in claim 1.

7. The device as claimed in claim 1, wherein the measuring means is a temperature sensor.

8. The device as claimed in claim 1, wherein the base of the measuring means is cylindrical.

9. The device as claimed in claim 1, wherein the safety means comprises at least one means for retaining cabling or tubes.

10. The device as claimed in claim 9, wherein the safety means is extended laterally by at least one branch comprising at least two jaws to retain a cable or cylindrical tube in position.

11. The device as claimed in claim 10, wherein the jaws have a flexural elasticity.

12. The device as claimed in claim 10, wherein the jaws are pivotably movable.

13. A safety device for a catalytic converter comprising:
    a heat screen installed substantially on a portion of an outer wall of the catalytic converter and including an opening configured to have a sensor fixed to the catalytic converter pass through the opening, the sensor comprising a base configured to make contact with the catalytic converter;
    a plate arranged on the heat screen, wherein the plate includes a circular opening and an oblong opening spaced apart from the circular opening, the circular opening having a diameter which is greater than a diameter of the base, the circular opening being delimited by a lip; and
    a fixing screw and nut to fix the plate to the heat screen such that the lip surrounds the base with a minimum clearance, the fixing screw extending through the oblong opening.

14. The device as claimed in claim 13, wherein the plate comprises stiffening ribs.

15. The device as claimed in claim 13, wherein the fixing screw is arranged on a surface of the heat screen and faces toward an outside of the catalytic converter, a base of the screw passes through the oblong opening arranged in the plate, and the nut cooperates with the base of the screw to lock the plate in position against the heat screen.

16. The device as claimed in claim 13, wherein the plate covers a protruding area of the heat screen.

17. The device as claimed in claim 13, wherein the sensor is a temperature sensor and the base of the sensor is cylindrical.

18. A motor vehicle engine comprising an operating safety device as claimed in claim 13.

19. The device as claimed in claim 13, wherein the plate is extended laterally by at least one branch comprising at least two jaws to retain a cable or cylindrical tube in position.

20. The device as claimed in claim 19, wherein the jaws have a flexural elasticity.

21. The device as claimed in claim 19, wherein the jaws are pivotably movable.

* * * * *